United States Patent [19]

Schleifstein et al.

[11] Patent Number: 5,264,474

[45] Date of Patent: * Nov. 23, 1993

[54] POLYMER COMPOSITIONS

[75] Inventors: Robert A. Schleifstein, Edison, N.J.; David S. Pietrewicz, Elgin, S.C.

[73] Assignee: MTM Americas Inc., Elgin, S.C.

[*] Notice: The portion of the term of this patent subsequent to Sep. 18, 2007 has been disclaimed.

[21] Appl. No.: 761,053

[22] Filed: Sep. 18, 1991

Related U.S. Application Data

[63] Continuation-in-part of Ser. No. 451,795, Dec. 1, 1989, abandoned, which is a continuation-in-part of Ser. No. 359,528, Jun. 1, 1989, Pat. No. 4,957,957, which is a continuation-in-part of Ser. No. 355,559, May 23, 1989, Pat. No. 4,957,958.

[51] Int. Cl.$^5$ ................................. C08K 5/43
[52] U.S. Cl. ........................... 524/169; 524/371; 524/411
[58] Field of Search ................. 524/371, 169, 411

[56] References Cited

U.S. PATENT DOCUMENTS 2,031,206  2/1936  Bren .................. 106/186
2,071,917  2/1937  Bren .................. 106/186

(List continued on next page.)

FOREIGN PATENT DOCUMENTS 51-46089  12/1976  Japan .

OTHER PUBLICATIONS

Chemical Abstracts No. 58:3341c (1963).
Chemical Abstracts No. 58:5671e (1963).
Chemical Abstracts No. 64:8383f (1966).
Chemical Abstracts No. 66:10128z (1966).
Chemical Abstracts No. 66:37571a (1966).
Chemical Abstracts No. 66:46777z (1966).
Chemical Abstracts No. 69:86897g (1968).
Chemical Abstracts No. 79:31720v (1972).
Chemical Abstracts No. 82:139884c (1974).
Chemical Abstracts No. 82:155946e (1974).
Chemical Abstracts No. 83:9414j (1975).
Chemical Abstracts No. 85:177002h (1976).
Chemical Abstracts No. 90:88260b (1978).
Chemical Abstracts No. 94:65359j (1980).
Chemical Abstracts No. 100:139066c (1983).
Chemical Abstracts No. 101:230066j (1984).
Chemical Abstracts No. 101:39014m (1984).
Kirk-Othmer, *Encyclopedia of Chemical Technology*, 18, pp. 111-113 (1982).

*Primary Examiner*—Kriellion S. Morgan
*Attorney, Agent, or Firm*—Nikaido, Marmelstein, Murray & Oram

[57] ABSTRACT

Described are thermoplastic or thermoset polymer and resin compositions (e.g., nylon, polyvinylchloride, phenolics, etc.) containing a bis-sulfonamide or polyhaloaromatic monosulfonamide in quantity sufficient to plasticize the resins and polymers. The polyhaloaromatic monosulfonamide contains (a) from 7 to 30 carbon atoms, (b) from 2 to 12 chlorine and/or bromine atoms, (c) one nitrogen atom, (d) an aromatic group, bonded to the sulfur atom, in which at least two chlorine or at least two bromine atoms or at least one chlorine atom and at least one bromine atom are directly bonded to the aromatic ring system, and (e) one or two aliphatic, cycloaliphatic, or aromatic organic groups bonded to the nitrogen atom, one such organic group, when an aromatic group, optionally being substituted by one or more bromine and/or chlorine atoms. The bis-sulfonamide contains at least two aromatic rings and from 14 to 30 carbon atoms in the molecule. These sulfonamides are of advantage in that they have relatively low volatilities and good thermal stability at polymer processing temperatures and serve as flame retardants therein. Bis-sulfonamides having an alkylene bridge group between two sulfonamide groups are particularly suitable as plasticizers for engineering resins such as polyimides, polyamide imides, polyether imides, polyether sulfones, polyether ketones, and engineered polyamides.

16 Claims, No Drawings

U.S. PATENT DOCUMENTS

| | | | |
|---|---|---|---|
| 2,319,954 | 5/1943 | Scott | 524/168 |
| 2,349,749 | 5/1944 | Paul | 524/168 |
| 2,809,210 | 10/1957 | Short et al. | 562/488 |
| 3,186,961 | 6/1965 | Sears | 524/114 |
| 3,281,233 | 10/1966 | Holmsen | 504/333 |
| 3,624,024 | 11/1971 | Caldwell et al. | 524/281 |
| 3,760,003 | 9/1973 | Asadorian et al. | 524/371 |
| 3,872,044 | 3/1975 | Hervey et al. | 524/169 |
| 3,873,567 | 3/1975 | Cyba | 548/451 |
| 3,904,700 | 9/1975 | Wolford et al. | 570/183 |
| 3,915,932 | 10/1975 | Wolford et al. | 570/183 |
| 4,123,411 | 10/1978 | Coran | 524/169 |
| 4,218,357 | 8/1980 | Mark et al. | 524/169 |
| 4,251,424 | 2/1981 | Pagilagan | 524/169 |
| 4,254,015 | 3/1981 | Thomas et al. | 524/169 |
| 4,399,246 | 8/1983 | Hyde | 524/169 |
| 4,486,560 | 12/1984 | Thomas | 524/169 |
| 4,745,143 | 5/1988 | Mason et al. | |
| 4,957,957 | 9/1990 | Schleifstein et al. | 524/169 |
| 4,957,958 | 9/1990 | Schleifstein | 524/169 |
| 4,957,964 | 9/1990 | Okumura et al. | 524/269 |
| 4,959,500 | 9/1990 | Schleifstein | 524/169 |
| 4,981,890 | 1/1991 | Schleifstein | 524/169 |

POLYMER COMPOSITIONS

This application is a continuation-in-part of pending application S. N. 07/451,795, filed Dec. 1, 1989, now abandoned, which is a continuation-in-part of application S. N. 07/359,528, filed Jun. 1, 1989, now U.S. Pat. No. 4,957,957, and application S. N. 07/355,559, filed May 23, 1989, now U.S. Pat. No. 4,957,958.

This invention relates to thermoplastic and thermoset polymer and adhesive resin compositions containing a sulfonamide in a sufficient quantity to plasticize the polymer or adhesive resin composition. The sulfonamides used pursuant to this invention have relatively low volatilities at polymer processing temperatures and thus minimize the extent to which the additive is vaporized during polymer processing. This in turn reduces the extent to which ambient air quality is impaired during processing.

In accordance with this invention, certain mono-sulfonamide and bis-sulfonamide plasticizers are added to thermoplastic condensation polymers and resins, thermoset polymers and resins, and hot-melt adhesive resins in order to improve the workability, flexibility, distensibility, and/or impact resistance of the polymer or adhesive during forming and in the finished product. In addition the mono-sulfonamide and bis-sulfonamides plasticizers can improve the dispersion of additives to the polymers and resins, as well as improve the wear properties of the finished product.

As noted above there are two basic types of plasticizers useful in the compositions of this invention, namely mono-sulfonamides and bis-sulfonamides. The mono-sulfonamide to be used as plasticizers pursuant to this invention are polyhaloaromatic mono-sulfonamides containing in the molecule (a) from 7 to 30 carbon atoms (preferably 8 to 24), (b) from 2 to 12 halogen atoms (chlorine or more preferably bromine), (c) one nitrogen atom, (d) an aromatic group, bonded to the sulfur atom, in which at least two chlorine or more preferably at least two bromine atoms, or at least one chlorine atom and at least one bromine atom are directly bonded to the aromatic ring system, and (e) one or two organic (aliphatic, cycloaliphatic, or aromatic) groups bonded to the nitrogen atom. The bis-sulfonamides used as plasticizers pursuant to this invention are aromatic bis-sulfonamides containing at least two aromatic rings (preferably two or three) and from 14 to 30 carbon atoms (preferably 18 to 24) in the molecule. In addition to above compositions, mixtures of two or more mono-sulfonamides or two or more bis-sulfonamides may be used as plasticizers. If desired, mixtures of any one or more mono-sulfonamides with any one or more bis-sulfonamides may also be used as plasticizers.

The mono-sulfonamide to be used as plasticizers pursuant to this invention are polyhaloaromatic mono-sulfonamides containing in the molecule (a) from 7 to 30 carbon atoms (preferably 8 to 24), (b) from 2 to 12 halogen atoms (chlorine or more preferably bromine), (c) one nitrogen atom, (d) an aromatic group, bonded to the sulfur atom, in which at least two chlorine or more preferably at least two bromine atoms, or at least one chlorine atom and at least one bromine atom are directly boned to the aromatic ring system, and (e) one or two organic (aliphatic, cycloaliphatic, or aromatic) groups bonded to the nitrogen atom. One such organic group, when an aromatic group, optionally is substituted by one or more bromine or chlorine atoms. In a preferred embodiment these mono-sulfonamides contain from 3 to 8 and most preferably from 3 to 6 halogen atoms (chlorine, bromine or a mixture of both) bonded to the aromatic ring system.

Among the mono-sulfonamides to be utilized pursuant to this invention are those represented by the general formula

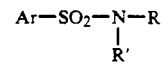

where Ar is a haloaromatic group in which at least two bromine or chlorine atoms are bonded to the ring system, R is a hydrocarbon group, and R' is a hydrogen atom, a hydrocarbon group or a haloaromatic group. Most preferably the total number of halogen atoms (chlorine and more preferably bromine) in the molecule is from 2 to 10, preferably from 3 to 6.

One preferred type of haloaromatic mono-sulfonamide to be utilized pursuant to this invention may be represented by the general formula

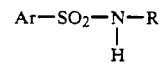

where Ar is a haloaromatic group in which at least three bromine or chlorine atoms are bonded to the ring system, and R is a hydrocarbon or haloaromatic group.

Another preferred type of haloaromatic mono-sulfonamide to be utilized pursuant to this invention may be represented by the general formula

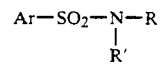

where Ar is a haloaromatic group in which at least three bromine or chlorine atoms are bonded to the ring system, and each of R and R' is a hydrocarbon group.

A particularly preferred type of haloaromatic mono-sulfonamide to be utilized pursuant to this invention may be represented by the general formula

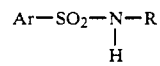

where Ar is a mononuclear bromoaryl group having 6 to 10 carbon atoms and 3 to 5 bromine atoms on the ring, and R is a $C_1$ to $C_{12}$ alkyl group, or a $C_6$ to $C_{12}$ aryl or bromoaryl group.

Another particularly preferred type of haloaromatic mono-sulfonamide to be utilized pursuant to this invention may be represented by the general formula

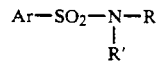

where Ar is a mononuclear bromoaryl group having 6 to 10 carbon atoms and 3 to 5 bromine atoms on the ring, R is a $C_1$ to $C_{12}$ alkyl group, or a $C_6$ to $C_{12}$ aryl or bromoaryl group, and R' is a $C_1$ to $C_{12}$ alkyl group, or a $C_6$ to $C_{12}$ aryl or bromoaryl group.

A few illustrative plasticizers useful in the practice of this invention include N-methyl-(dibromobenzene)sulfonamide,
N-ethyl-(dibromobenzene)sulfonamide,
N-octyl-(dibromobenzene)sulfonamide,
N-decyl-(dibromobenzene)sulfonamide,
N-dodecyl-(dibromobenzene)sulfonamide,
N-isopropyl-(dichlorobenzene)sulfonamide,
N-pentyl-(dichlorobenzene)sulfonamide,
N-heptyl-(dichlorobenzene)sulfonamide,
N-nonyl-(bromochlorobenzene)sulfonamide,
N-undecyl-(bromochlorotoluene)sulfonamide,
N-cyclohexyl-(dibromobenzene)sulfonamide,
N-cyclooctyl-(bromochloroxylene)sulfonamide,
N-phenyl-(dibromobenzene)sulfonamide,
N-phenyl-(dibromotrimethylbenzene)sulfonamide,
N-tolyl-(butyldibromobenzene)sulfonamide,
N-biphenylyl-(bromochloroxylene)sulfonamide,
N-1-naphthyl-(dibromobenzene)sulfonamide,
N-1-tetrahydronaphthyl-(dibromobenzene)sulfonamide,
N-(9-anthracenyl)-(dichlorobenzenesulfonamide),
N-methyl-(tribromobenzene)sulfonamide,
N-butyl-(tribromobenzene)sulfonamide,
N-propyl-(tribromobenzene)sulfonamide,
N-butyl-(tribromobenzene)sulfonamide,
N-hexyl-(tribromobenzene)sulfonamide,
N-decyl-(tribromobenzene)sulfonamide,
N-dodecyl-(tribromobenzene)sulfonamide,
N-isopropyl-(trichlorobenzene)sulfonamide,
N-heptyl-(trichlorobenzene)sulfonamide,
N-nonyl-(dibromochlorobenzene)sulfonamide,
N-cyclohexyl-(tribromobenzene)sulfonamide,
N-cyclooctyl-(bromodichloroxylene)sulfonamide,
N-phenyl-(trichlorobenzene)sulfonamide,
N-phenyl-(tribromobenzene)sulfonamide,
N-phenyl-(tribromophenylbenzene)sulfonamide,
N-tolyl-(butyltribromobenzene)sulfonamide,
N-biphenylyl-(dibromochloroxylene)sulfonamide,
N-2-naphthyl-(trichlorobenzene)sulfonamide,
N-1-tetrahydronaphthyl-(tribromobenzene)sulfonamide,
N-(9-anthracenyl)-(trichlorobenzenesulfonamide),
N-ethyl-(tetrabromobenzene)sulfonamide,
N-tert-butyl-(tetrabromobenzene)sulfonamide,
N-hexyl-(tetrabromobenzene)sulfonamide,
N-octyl-(tetrabromobenzene)sulfonamide,
N-dodecyl-(tetrabromobenzene)sulfonamide,
N-methyl-(tetrachlorobenzene)sulfonamide,
N-butyl-(tetrachlorobenzene)sulfonamide,
N-octyl-(tetrachlorobenzene)sulfonamide,
N-dodecyl-(tetrachlorobenzene)sulfonamide,
N-methyl-(pentabromobenzene)sulfonamide,
N-propyl-(pentabromobenzene)sulfonamide,
N-hexyl-(pentabromobenzene)sulfonamide,
N-decyl-(pentabromobenzene)sulfonamide,
N-tribromophenyl-(tribromobenzene)sulfonamide,
N-phenyl-(pentabromobenzene)sulfonamide,
N-tribromophenyl-(tribromobenzene)sulfonamide,
N-cyclohexyl-(dibromotoluene)sulfonamide,
N-octyl-(tetrachlorobenzene)sulfonamide,
N-isobutyl-(dibromotrichlorobenzene)sulfonamide,
N-butyl-(octabromobibenzene)sulfonamide,
N,N-dimethyl-(dibromobenzene)sulfonamide,
N,N-dibutyl-(tribromobenzene)sulfonamide,
N-methyl-N-octyl-(pentabromobenzene)sulfonamide,
N,N-diphenyl-(tribromobenzene)sulfonamide,
N,N-dicyclohexyl-(tetrabromobenzene)sulfonamide,
N,N-di(dichlorophenyl)-(trichloroxylene)sulfonamide,
N,N-dimethyl-(tetrachlorobenzene)sulfonamide,
N,N-dibutyl-(octachlorobibenzene)sulfonamide,
N-cyclopentyl-N-octyl-(trichlorophenylcarbinylbenzene)sulfonamide,
N,N-dinonyl-(bromohhlorobenzene)sulfonamide,
N-methyl-N-(1,2,3,4-tetrahydro-1-naphthyl)-(tribromobenzene)
sulfonamide), and
N,N-di(tetradecyl)-(tribromobenzene)sulfonamide.

The bis-sulfonamides to be utilized as plasticizers pursuant to this invention are aromatic bis-sulfonamides containing at least two aromatic rings (preferably two or three) and from 14 to 30 carbon atoms (preferably 18 to 24) in the molecule. In a preferred embodiment these aromatic bis-sulfonamides contain from 1 to 14 and most preferably from 6 to 14 halogen atoms (preferably chlorine or a mixture of chlorine and bromine, and most preferably bromine).

Among the aromatic bis-sulfonamides to be utilized pursuant to this invention are those represented by the general formula

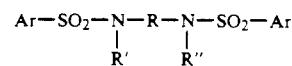

where Ar are the same or different aromatic or haloaromatic groups, R is a divalent hydrocarbon or halohydrocarbon group, and R' and R'' are independently hydrogen atoms, hydrocarbon groups or halohydrocarbon groups. Most preferably the two Ar groups are both the same as each other, and R' and R'' are identical to each other.

One preferred type of aromatic bis-sulfonamides to be utilized pursuant to this invention are halogen-free compounds which may be represented by the general formula

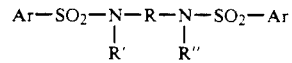

where each Ar group is a mononuclear aryl group having 6 to 10 carbon atoms, R is an alkylene group having from 1 to 8 carbon atoms, and R' and R'' are identical to each other and are hydrogen or alkyl groups each having up to 12 carbon atoms, and preferably up to about 8 carbon atoms.

Another preferred type of aromatic bis-sulfonamides to be utilized pursuant to this invention are halogen-free compounds which may be represented by the general formula

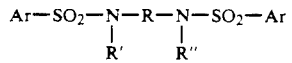

where each Ar group is a mononuclear aryl group having 6 to 10 carbon atoms, R is a cycloalkylene group having from 6 to 10 carbon atoms, and R' and R'' are identical to each other and are hydrogen or alkyl groups each having up to 12 carbon atoms, and preferably up to about 8 carbon atoms.

Still another preferred type of aromatic bis-sulfonamides to be utilized pursuant to this invention are halogen-free compounds which may be represented by the general formula

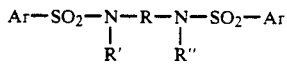

where each Ar group is a mononuclear aryl group having 6 to 10 carbon atoms, R is an arylene group having from 6 to 10 carbon atoms, and R' and R" are identical to each other and are hydrogen or alkyl groups each having up to 12 carbon atoms, and preferably up to about 8 carbon atoms.

One preferred type of halogen-containing aromatic bis-sulfonamides to be utilized pursuant to this invention are compounds which may be represented by the general formula

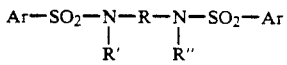

where each Ar group is a mononuclear aryl group having 6 to 10 carbon atoms and from 1 to 5 halogen atoms (preferably chlorine or bromine or both), and most preferably having 3 to 5 bromine atoms, R is an alkylene group having from 1 to 8 carbon atoms, and R' and R" are identical to each other and are hydrogen or alkyl groups each having up to 12 carbon atoms, and preferably up to about 8 carbon atoms.

Another preferred type of halogen-containing aromatic bis-sulfonamides to be utilized pursuant to this invention are compounds represented by the general formula

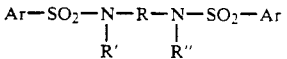

where each Ar group is a mononuclear aryl group having 6 to 10 carbon atoms and from 1 to 5 halogen atoms (preferably chlorine or bromine or both), and most preferably having 3 to 5 bromine atoms, R is a cycloalkylene group having from 6 to 10 carbon atoms, and R' and R" are identical to each other and are hydrogen or alkyl groups each having up to 12 carbon atoms, and preferably up to about 8 carbon atoms.

Still another preferred type of halogen-containing aromatic bis-sulfonamides to be utilized pursuant to this invention are compounds represented by the general formula

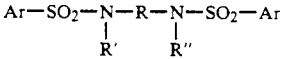

where each Ar group is a mononuclear aryl group having 6 to 10 carbon atoms and from 1 to 5 halogen atoms (preferably chlorine or bromine or both), and most preferably having 3 to 5 bromine atoms on the aromatic ring, R is an arylene group having from 6 to 14 carbon atoms and optionally having from 1 to 4 bromine ring substituents, and R' and R" are identical to each other and are hydrogen or alkyl groups each having up to 18 carbon atoms, and preferably up to about 8 carbon atoms.

Another preferred type of halogen-containing aromatic bis-sulfonamides to be utilized pursuant to this invention are compounds represented by the general formula

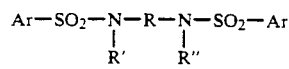

where each Ar group is a phenyl group having from 1 to 5 halogen atoms (preferably chlorine or bromine or both), and most preferably having 3 to 5 bromine atoms on the aromatic ring, R is a phenylene group optionally having from 1 to 4 bromine ring atoms on the ring or a biphenylene group optionally having from 1 to 8 ring-substituted; bromine atoms, and R' and R" are identical to each other and are hydrogen or alkyl groups each having up to 18 carbon atoms, and preferably up to about 8 carbon atoms.

Still another preferred type of halogen-containing aromatic bis-sulfonamides to be utilized pursuant to this invention are compounds which may be represented by the general formula

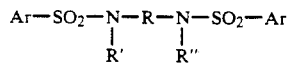

where each Ar group is a mononuclear aryl group having 6 to 10 carbon atoms and from 1 to 5 halogen atoms (preferably chlorine or bromine or both), and most preferably having 3 to 5 bromine atoms, R is an arylene group having from 6 to 10 carbon atoms, and R' and R" are identical to each other and are hydrogen oralkyl groups each having up to 18 carbon atoms, and preferably up to about 8 carbon atoms.

A few illustrative bis-sulfonamide plasticizers useful in the practice of this invention include
N,N'-p-cyclohexylenebis(benzenesulfonamide),
N,N'-o-phenylenebis(benzenesulfonamide),
N,N'-p-phenylenebis(benzenesulfonamide),
N,N'-hexamethylenebis(benzenesulfonamide),
N,N'-hexamethylenebis(benzenesulfonamide),
N,N'-hexamethylenebis(4-chlorobenzenesulfonamide),
N,N'-hexamethylenebis(2,5-dichlorobenzenesulfonamide),
N,N'-hexamethylenebis(2,4,5-trichlorobenzenesulfonamide),
N,N'-hexamethylenebis(2,4,5-tribromobenzenesulfonamide),
N,N'-ethylenebis(2,4,5-tribromobenzenesulfonamide),
N,N'-ethylenebis(benzenesulfonamide),
N,N'-ethylenebis(2,5-dichlorobenzenesulfonamide),
N,N'-ethylenebis(4-bromobenzenesulfonamide),
N,N'-ethylenebis(2,4,5-trichlorobenzenesulfonamide),
N,N'-(1,2,3,4-terahydro-1,4-naphthalenediyl)bis(4-bromobenzene sulfonamide),
N,N'-1,2-ethanediylbis[2,5-dibromo-N-ethylbenzenesulfonamide],
N,N'-(9,10-dihydro-9,10-anthracenediyl)bis[N-methylbenzene sulfonamide),
N,N'-(9,10-dihydro-9,10-anthracenediyl)bis[4-chloro-N-methyl benzenesulfonamide),
N,N'-p-phenylenebis(2,4,5-tribromobenzenesulfonamide),
N,N'-p-phenylenebis(2,3,4,5-tetrabromobenzenesulfonamide),
N,N'-(dibromo-p-phenylene)bis(tribromobenzenesulfonamide).

N,N'-o-phenylenebis(tribromobenzenesulfonamide),
N,N'-o-phenylenebis(tetrabromobenzenesulfonamide),
N,N'-o-phenylenebis(pentabromobenzenesulfonamide),
N,N'-p-phenylenebis(tribromobenzenesulfonamide),
N,N'-p-phenylenebis(tetrabromobenzenesulfonamide),
N,N'-p-phenylenebis(pentabromobenzenesulfonamide),
N,N'-m-phenylenebis(tribromobenzenesulfonamide),
N,N'-p-(bromophenylene)bis(tribromobenzenesulfonamide).
N,N'-p-(dibromophenylene)bis(tribromobenzenesulfonamide).
N,N'-p-(tribromophenylene)bis(tribromobenzenesulfonamide).
N,N'-p-(tetrabromophenylene)bis(tribromobenzenesulfonamide).
N,N'-p-(tetrabromophenylene)bis(tetrabromobenzenesulfonamide).
N,N'-p-(tetrabromophenylene)bis(pentabromobenzenesulfonamide).
N,N'-p-(dibromophenylene)bis(tribromotoluenesulfonamide).
N,N'-p (dibromophenylene)bis(2,5-dibromo-4-ethylbenzenesulfonamide).
N,N'-(1,2,3,4-tetrahydro-1,4-naphthalenediyl)bis(tribromobenzenesulfonamide),
N,N'-(9,10-dihydro-9,10-anthracenediyl)bis[N-methyltribromobenzenesulfonamide),
4',4'''-(2,2'',4,4'',5,5''-hexabromo)bi[benzenesulfonanilide],
N,N'-(9,10-dihydro-9,10-anthracenediyl)bis[tetrabromo-N-ethyl
benzenesulfonamide),
N,N'-p-(bromophenylene)bis(tribromoxylenesulfonamide).
N,N'-p-(2,5-xylylene)bis(2,3,4,5-tetrabromobenzenesulfonamide), and
N,N'-(dibromoxylylene)bis(tribromobenzenesulfonamide).

General methods which can be utilized for the preparation of the mono-sulfonamides and bis-sulfonamides used pursuant to this invention are known and reported in the literature. The most common procedure for preparing mono-sulfonamides is to react a polyhaloaromatic sulfonyl halide with an aliphatic, cycloaliphatic or aromatic primary or secondary amine. Similarly, the most common procedure for preparing bis-sulfonamides is to react an aromatic sulfonyl halide with an aliphatic, cycloaliphatic or aromatic diamine. The halogen-containing aromatic bis-sulfonamides may be formed either by utilizing an aromatic sulfonyl halide having one or more halogen atoms on the ring or by subjecting a halogen-free aromatic bis-sulfonamide to chlorination or bromination under usual conditions for effecting substitutive ring halogenation of aromatic hydrocarbons. For further details concerning applicable synthesis procedures, see for example Holmsen, U.S. Pat. No. 3,281,233; Kirsanov, et al., Zh. Obshch. Khim., 1962. Vol. 32, 887–92; El-Hewehi, et al., J. Prakt. Chem., 1962, Vol. 16 No. 5-6, 297–336; El-Hewehi, et al., J. Prakt. Chem., 1966, Vol. 34 No. 5-6, 218–242, and Kuliev, Dokl. Akad. Nauk Az. SSR. 1976, Vol. 32 (4) 25–29, all disclosures of which are incorporated herein by reference.

A wide variety of thermoplastic and thermoset polymers and resins can be used in forming the compositions of this invention. Included are such thermoplastic and thermoset resins as polyamides (all types of nylons such as nylon 3, nylon 4, nylon 6, nylon 6,6, nylon 6,10, nylon 6,12, nylon 7, nylon 8, nylon 11, nylon 12, nylon 12,12, etc.) polyesters (e.g., polyethylene terephthalate, polybutylene terephthalate, etc.), alkyds, polyphenylene oxides either singly or in blends with polystyrene (both rubber-free and rubber-modified), and the like. Polyolefins (e.g., polyethylenes, polypropylenes, etc.) may also be plasticized pursuant to this invention. Of the condensation polymers, nylon 6 (polycaprolactam), nylon 6,6 (the polyamide of hexamethylene diamine and adipic acid), nylon 12 (polylaurolactam), and nylon 12,12 are particularly preferred. Other resins which can be used in forming the compositions of this invention include the cellulosics (e.g., cellulose nitrate, cellulose acetate, cellulose acetate-butyrate, ethyl cellulose, etc.), acrylic-type resins, phenolics, polyvinyl resins (polyvinyl chloride, polyvinyl acetate, polyvinylidene chloride, etc.), fluoroplastics, silicones, epoxy resins and the like.

A particularly preferred class of polymers for forming the composition of the present invention are the engineering resins, which are defined as thermoplastic polymers having consistent and reproducible physical properties which permit their use in various applications. Illustrative polymers include polyimides, polyamide imides, polyether imides, polyether sulfones, polyaryl sulfones, polyether ketones, polyether ether ketones, polyphenylene sulfides, polyarylates and engineered polyamides, e.g., polyamides which have been chemically modified, filled or blended with another polymer to achieve the desired level of physical properties. Other polymers of interest include polybutylene terephthalate, polystyrene, styrene, maleic anhydride copolymer, and polychlorofluoroethane.

Engineering resins typically possess a higher melting point (about 300°–400° C.) than non-engineering resins (about 200°–300° C.), as well as a high modulus of elasticity and high tensile strength. The higher melting points, and thus processing temperatures, typically associated with engineering resins has resulted in a heretofore unsatisfied need for a low volatility plasticizer which can reduce resin melt viscosity without significantly reducing modulus. More specifically, conventional plasticizers tend to boil or "flash off" from the resin melt during processing. This vaporization exposes plant workers to a VOC (volatile organic compound) health risk, and reduces the amount of plasticizer in the polymer, thus leading to viscosity increases and associated processing problems. A low volatility plastcizer would minimize or eliminate these problems, and may well exhibit reduced leaching or migration from the plastic over time.

The plasticizers of the present invention exhibit low volatility and thus possess particular utility for high temperature processing of engineering resins. N-butyl-(2,4,5-tribromobenzene)sulfonamide is a monosulfonamide which may have particular utility as an engineering resin plasticizer. Bis-sulfonamides which possess straight, branched, or cycloaliphatic alkylene bridges, and which are particularly preferred as engineering resins plasticizers include the following:

N,N'-bisbenzenesulfonyl-1,6-hexyldiamine
  melting point: 151° C.
N,N'-bisbenzenesulfonyl-2-methyl-pentyldiamine
  melting point: 79°–86° C.
N,N'-bisbenzenesulfonyl-2,2-dimethyl-1,3-propyldiamine
  melting point: 139°–141° C.
N,N'-bisbenzenesulfonyl-1,3-pentyldiamine
  melting point: 82°–84° C.

N,N'-bisbenzenesulfonyl-1,12-dodecyldiamine
  melting point: 86°–89° C.
N,N'-bisbenzenesulfonyl-1,2-cyclohexyldiamine (70% Cis/30% trans isomers)
  melting point: 125°–135° C.
N,N'-bisbenzenesulfamidylmethyl-1,4-cyclohexane (mixture of isomers)
  melting point: 236°–238° C.
bis(ortho-toluenesulfamidyl-4-cyclohexyl)methane (mixture of isomers)
  melting point: 150°–180° C.
N,N'-bisbenzenesulfamidyl-1,4-benzene is another bis-sulfonamide which may have utility as an engineering resin plasticizer.

The concentration of the polyhaloaromatic monosulfonamides and aromatic bis-sulfonamides used will of course be dependent to some extent upon the identity and properties of the substrate thermoplastic or thermoset resin as well as the properties desired in the finished product. Generally speaking, however, the resin will normally contain an amount of polyhaloaromatic monosulfonamide or aromatic bis-sulfonamide falling in the range of from about 1 to about 200, and preferably from about 1 to about 20, parts by weight per hundred parts by weight of the total thermoplastic composition. However, departures from these ranges are entirely permissible and are within the ambit of this invention. Those skilled in the art can readily determine optimal proportions by the simple expedient of performing a few simple tests with the materials selected for use.

Methods for blending the plasticizers into the substrate resins are conventional and well known to those skilled in the art. It is recognized that to be effective with any polymeric material or resin, the plasticizer must be intimately mixed with the resin or polymer. To achieve intimate mixing, the resin may be dissolved in the plasticizer or the plasticizer dissolved in the resin; the resin and plasticizer may be dissolved in a common solvent, the solvent being subsequently removed by evaporation; or the plasticizer may be poured with the resin onto a hot two-roll mill wherein the resin softens and fuses with the aid of the plasticizer, as well as other recognized methods of obtaining intimate mixing of resins and plasticizers.

Other conventionally used additives such as reinforcing fillers, pigments, mold release agents, nucleating agents, flame retardants, flame retardant synergists (antimony oxide, zinc borate, ferri oxide, etc.), heat stabilizers, U.V. stabilizers, antioxidants, and the like may be included in the compositions of this invention. Such additives may be employed in their customary concentrations. A particularly preferred additive complement, especially for use in nylon, is the combination of tetradecabromodiphenoxybenzene and antimony oxide wherein the polymer contains from about 10 to about 15 weight percent of the tetradecabromodiphenoxybenzene and from about 3 to about 6 weight percent of the antimony oxide.

In the practice of this preferred embodiment there is employed an amount of the polyhaloaromatic monosulfonamide and/or bis-sulfonamide plasticizer sufficient to impart workability, flexibility, distensibility, or impact resistance to the resultant finished composition. Typical compositions of resin and plasticizer of this invention are illustrated in the following table:

| Polymer or Resin | Plasticizer (in phr*) | | | | |
| --- | --- | --- | --- | --- | --- |
| | N,N'-hexamethylene-bis(benzene-sulfonamide) | N,N'-p-phenylene-bis(benzene sulfonamide) | N-butyl-(tribromo-benzene-sulfonamide) | N,N'-ethylene-bis(benzene-sulfonamide) | N,N'-ethylene-bis(2,4,5-tri-bromobenzene sulfonamide |
| poly(vinyl chloride) | 50 | 40 | 20 | 80 | 90 |
| poly(vinyl acetate) | 90 | 40 | 30 | 100 | 150 |
| poly(vinylidene chloride) | 40 | 30 | 20 | 60 | 70 |
| poly(vinylidene fluoride) | 40 | 30 | 20 | 60 | 70 |
| polystyrene | 40 | 40 | 20 | 20 | 50 |
| ethyl cellulose | 150 | 140 | 80 | 90 | 100 |
| cellulose nitrate | 140 | 130 | 70 | 80 | 90 |
| cellulose acetate | 70 | 60 | 30 | 40 | 40 |
| cellulose acetate butyrate | 70 | 60 | 30 | 40 | 40 |
| chlorinated rubber | 30 | 30 | 20 | 40 | 50 |
| high styrene butadiene | 50 | 60 | 30 | 70 | 90 |
| nylon 6 | 80 | 90 | 50 | 100 | 80 |
| nylon 6,6 | 70 | 80 | 40 | 90 | 90 |
| nylon 12 | 80 | 90 | 50 | 100 | 80 |
| nylon 12,12 | 70 | 80 | 40 | 90 | 90 |
| polyethylene terephthalate | 40 | 50 | 30 | 70 | 80 |
| polybutylene terephthalate | 30 | 40 | 20 | 60 | 70 |
| polycarbonates | 40 | 30 | 20 | 30 | 40 |
| epoxies | 60 | 60 | 50 | 60 | 60 |
| phenolics | 60 | 60 | 50 | 60 | 60 |
| alkyds | 30 | 30 | 20 | 30 | 30 |
| silicones | 40 | 40 | 30 | 40 | 40 |
| polyethylene | 80 | 70 | 40 | 90 | 100 |
| polypropylene | 80 | 70 | 40 | 90 | 100 |
| polyphenylene oxides | 50 | 60 | 30 | 70 | 90 |

*phr = parts by weight per hundred parts by weight of resin

The compositions of this invention illustrated in the above table are meant to be illustrative rather than limitative of the practice of this invention. Hence, this invention is susceptible to considerable variation in its practice within the spirit and scope of the appended claims.

What is claimed is:
1. A composition comprising a plasticizable thermoplastic or thermoset polymer or resin and at least one aromatic bis-sulfonamide in a quantity which is sufficient to plasticize the polymer, the aromatic bis-sulfonamide having at least two aromatic rings and from 14 to 30 carbon atoms.

2. A composition of claim 1 wherein the aromatic bis-sulfonamide has two aromatic rings and from 16 to 24 carbon atoms in the molecule.

3. A composition of claim 1 wherein the aromatic bis-sulfonamide has three aromatic rings and from 18 to 24 carbon atoms in the molecule.

4. A composition of claim 1 wherein the aromatic bis-sulfonamide is represented by the general formula

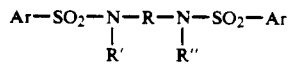

where each Ar group is a mononuclear aryl group having 6 to 10 carbon atoms, R is an alkylene group having from 1 to 20 carbon atoms, and R' and R" are identical to each other and are hydrogen or alkyl groups each having up to 12 carbon atoms.

5. A composition of claim 1 wherein the bis-sulfonamide is N,N'-p-phenylenebis(benzenesulfonamide).

6. A composition of claim 1 wherein the bis-sulfonamide is N,N'-p-phenylenebis(benzenesulfonamide).

7. A composition of claim 1 wherein the polymer is a plasticizable polyamide polymer.

8. A composition of claim 1, wherein said polymer is an engineering resin selected from the group consisting of polyimides, polyamide imides, polyether imides, polyether sulfones, polyaryl sulfones, polyether ketones, polyether ether ketones, polyphenylene sulfides, polyarylates and engineered polyamides.

9. A composition of claim 4, wherein R is a branched alkylene group, and said resin is an engineering resin selected from the group consisting of polyimides, polyamide imides, polyether imides, polyether sulfones, polyaryl sulfones, polyether ketones, polyether ether ketones, polyphenylene sulfides, polyarylates and engineered polyamides.

10. A composition of claim 4, wherein R is a cycloalkylene group, and said resin is an engineering resin selected from the group consisting of polyimides, polyamide imides, polyether imides, polyether sulfones, polyaryl sulfones, polyether ketones, polyether ether ketones, polyphenylene sulfides, polyarylates and engineered polyamides.

11. A composition of claim 4, wherein R is a straight chain alkylene group, and said resin is an engineering resin selected from the group consisting of polyimides, polyamide imides, polyether imides, polyether sulfones, polyaryl sulfones, polyether ketones, polyether ether ketones, polyphenylene sulfides, polyarylates and engineered polyamides.

12. A composition as claimed in claim 4 where in R is a mononuclear aryl group, said resin is an engineering plastic selected from the group consisting of: polyimides, polyamide imides, polyether imides, polyether sulfones, polyether ketones, polyphenylene sulfides, polyarylates, fluoropolymers, and engineered polyamides.

13. A composition as claimed in claim 1 wherein said bis-sulfonamide is at least one member selected from the group consisting of:
N,N'-1,6-hexanediyl bis (benzene sulfonamide),
N,N'-2-methyl-1,5-pentanediyl bis (benzene sulfonamide),
N,N'-2,2-dimethyl-1,3-propanediyl bis (benzene sulfonamide),
N,N'-1,3- pentanediyl bis (benzene sulfonamide),
N,N'-1,12-dodecanediyl bis (benzene sulfonamide),
N,N'-1,2-cyclohexanediyl bis (benzene sulfonamide),
N,N'-1,4-cyclohexanediyl bis (benzene sulfonamide),
N,N'-1,4-phenylene bis (benzene sulfonamide),
N,N'-(1,4-cyclohexyl) dimethanediyl bis (benzene sulfonamide), and
N,N'-4,4-methylenediyl bis (ortho-toluene sulfonamide).

14. A composition as claimed in claim 13 wherein said bis-sulfonamide is N,N'-2,2-dimethyl-1,3-propanediyl bis (benzene sulfonamide).

15. A composition as claimed in claim 13 wherein said bis-sulfonamide is N,N'-1,3-pentanediyl bis (benzene sulfonamide).

16. A composition of claim 14 wherein said plasticizer is present in an amount of from 1 to 20 phr.

* * * * *